(No Model.)

F. H. MOORE.
AERATOR FOR DISTILLED WATER.

No. 537,392. Patented Apr. 9, 1895.

Witnesses
Winifred F. Kerwin
Edward E. Brown

Inventor
Frederic H. Moore
by Edwin Planta
Attorney

THE NORRIS PETERS CO., PHOTO-LITHO., WASHINGTON, D. C.

UNITED STATES PATENT OFFICE.

FREDERIC H. MOORE, OF BOSTON, MASSACHUSETTS.

AERATOR FOR DISTILLED WATER.

SPECIFICATION forming part of Letters Patent No. 537,392, dated April 9, 1895.

Application filed March 31, 1893. Serial No. 468,516. (No model.)

*To all whom it may concern:*

Be it known that I, FREDERIC H. MOORE, a citizen of the United States, residing at Boston, in the county of Suffolk and State of Massachusetts, have invented certain new and useful Improvements in Aerators for Distilled Water, of which the following, taken in connection with the accompanying drawings, is a specification.

Water that has been distilled is what is called flat or dead, and has to be aerated to give it life, and this can only be accomplished by exposing the said distilled water to the atmosphere and breaking it up so that air will come into contact with and be absorbed by every particle.

The object of my invention is to produce an aerator in which the water after it leaves the still will pass slowly down a conduit and in its passage be constantly broken up so that every particle will be exposed so as to absorb atmospheric air thus thoroughly aerating said water.

The invention consists of an open conduit or trough running from the condenser to the reservoir and pitching downward at a slight angle so as to allow the water to flow freely but slowly. In this conduit are arranged a number of perforated gates or dams through which the water slowly passes so as to break up and expose the water to the air. These gates or dams may be permanent or adjustable all as hereinafter fully described and pointed out in the claims.

Figure 2:
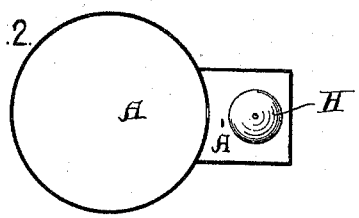
Figure 1:
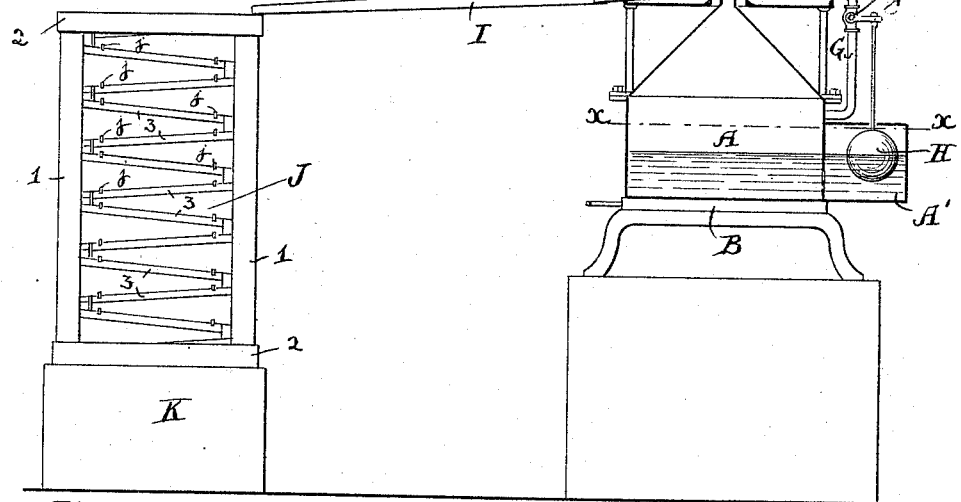
Figure 3:
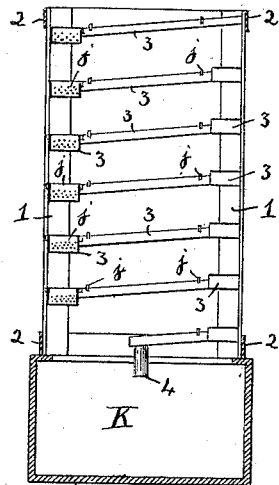
Figure 5:
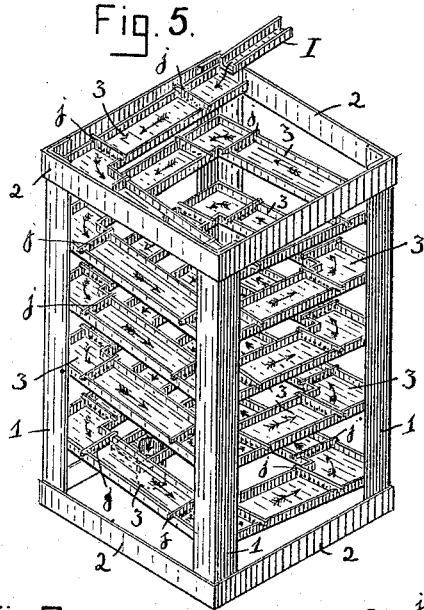
Figure 6:
Figure 4:
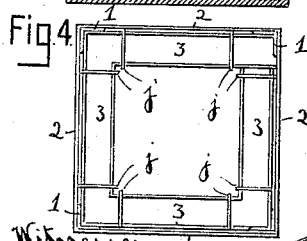
Figure 7:
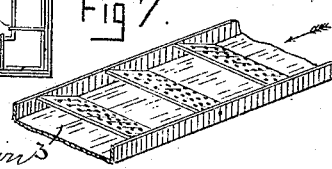
Figure 8:
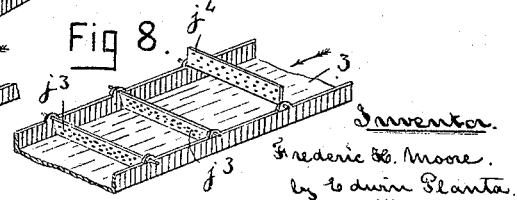

Referring to the accompanying drawings, Figure 1 represents a side view of an aerator embodying my invention connected to a condenser arranged over a boiler both of which are shown in section. Fig. 2 is a horizontal section taken on line $x, x$, of Fig. 1. Fig. 3 is a vertical section of the aerator. Fig. 4 is a plan or top view of same. Fig. 5 is a perspective view of the aerator. Figs. 6 to 8 are detail views showing various forms of dams or gates.

A, represents a boiler heated by a gas stove B. Above this boiler is a condensing vessel C, in which is arranged a coil D, one end of which is connected to the top of the boiler A, and the other end passes out through the side of the vessel C. The vessel C, is filled with water from a supply pipe E, and said vessel is provided with an overflow F. The boiler is supplied with water from the vessel C, by means of a pipe G, that is fitted with a valve $g$, which is opened and closed by a ball H, working in a small chamber A', formed on one side of the boiler. The outer end of the coil D, connects with an open trough I, that conducts the condensed water to the aerator J.

The aerator consists of an open vertical frame the corners of which are preferably formed of angle pieces 1, connected together at the top and bottom by bars 2. In this frame is arranged a conduit or trough 3, that passes from side to side on a slight incline from the top of the frame to the bottom as is best illustrated in Fig. 5, and terminates in a round pipe 4, that leads to the receiver K. In this trough 3, is arranged a number of perforated dams or gates $j$, as shown in Fig. 6. The sides of the conduit or trough are cut out for a portion of their depth to hold the said gates in place, the gates being also cut out as shown at $j'$, to fit over the sides of the conduit or trough 3. Instead of these removable dams or gates the conduit or trough might be provided with a series of permanent perforated dams set on an angle and extending from the bottom to the top of the trough as shown in Fig. 7, but I prefer the form shown in Fig. 8, in which the dams or gates are of perforated metal hinged or fulcrumed at their upper ends to the sides of the conduit or trough 3, and when in use stand at a slight angle as shown at $j^3$. By being thus hinged they can each be readily turned up as shown at $j^4$, to be wiped or cleansed when required without interfering with the flow of the water. It will be seen that by this construction of dams or gates the water will have to pass through the perforations in same (not over the dams or gates). Thus every particle of the condensed water will be repeatedly and thoroughly broken up and exposed to the atmosphere and absorb oxygen.

The operation is as follows: The gas stove B, being lighted, the water in the boiler A, is heated until steam is generated which passes up and through the worm or coil D, where it is condensed and is delivered to the pipe or trough I, that conducts it to the aerator J, into the conduit or trough 3, down which it slowly passes, it being in its passage broken up repeatedly and thoroughly by the perforated gates or dams thus exposing it to the atmosphere, and causing it to absorb the air. It then passes to the receiver when it is ready for use.

What I claim is—

1. An aerator for distilled water consisting of an inclined conduit or trough, and a series of perforated dams or gates movably secured therein whereby each dam or gate may be moved so that it may be cleansed without interfering with the flow of the water being aerated, substantially as set forth.

2. An aerator for distilled water consisting of a rectangular frame, a series of inclined conduits or troughs arranged therein, each conduit being provided with perforated dams or gates for breaking up the water in passing through the aerator, substantially as set forth.

3. In an aerator for distilled water, the combination with vertical angle pieces, of top and bottom bars for securing them together, a conduit that passes from side to side on a slight angle from the top to the bottom, and a series of perforated dams or gates across the conduit, substantially as set forth.

In testimony whereof I have signed my name to this specification, in the presence of two subscribing witnesses, on this 27th day of March, A. D. 1893.

FREDERIC H. MOORE.

Witnesses:
   CHAS. STEERE,
   EDWIN PLANTA.